United States Patent [19]

Ramirez

[11] 4,388,580

[45] Jun. 14, 1983

[54] MAGNETIC DEVICE FOR CONTROLLING STARTING OF A SINGLE PHASE INDUCTION MOTOR

[76] Inventor: Antonio Ramirez, 5725 Buade St., St-Leonard, Montreal, Canada, H1S 1E3

[21] Appl. No.: 321,580

[22] Filed: Nov. 16, 1981

[51] Int. Cl.³ .............................................. H02P 1/42
[52] U.S. Cl. .................................... 318/787; 318/786
[58] Field of Search ................................. 318/786, 787

[56] References Cited

U.S. PATENT DOCUMENTS

| | | | |
|---|---|---|---|
| 3,116,445 | 12/1963 | Wright | 318/786 |
| 3,538,411 | 11/1970 | Knauer et al. | 318/787 |
| 3,573,579 | 4/1971 | Lewus | 318/787 |

Primary Examiner—David Smith, Jr.
Attorney, Agent, or Firm—Thierry Orlhac

[57] ABSTRACT

A starter device for a single phase A.C. motor having a main winding and a starting winding disposed for connection to a single A.C. source. This starter device comprises a semiconductor switching device having a control electrode and a transconductive path, such as, for example a triac. This switching device is connected in series with the starting winding and the single A.C. source to energize or disconnect this starting winding. A magnetic detector is disposed between two adjacent poles of the main winding of the stator of the motor and has its axis of detection extending in the direction of the lines of magnetic flux forced out of the two adjacent saturated poles of the main winding during the initial inrush of current through this main winding upon starting of the motor. This detector has its two terminals respectively connected to the control electrode and to one of the power electrodes of the switching device in order to supply the control electrode when a magnetic flux is sensed to activate the switching device and therefore, to energize the starting winding. Upon starting of the motor, the sensed magnetic flux induces a current through the detector and energizes the starting winding. When the motor runs at nominal speed, the starting winding is disconnected because no magnetic flux is sensed.

6 Claims, 3 Drawing Figures

MAGNETIC DEVICE FOR CONTROLLING STARTING OF A SINGLE PHASE INDUCTION MOTOR

The present invention relates to a starter device for a single phase A.C. motor.

It is known that all the standard single phase A.C. motors comprise two stator windings, a running winding which operates the motor and a starting winding which is used to start the motor. The starting winding is needed because the running winding does not provide any torque until the rotor of the motor rotates at nominal speed. It is therefore a known practice to energize both the running and starting windings until the desired speed is reached and then to disconnect the starting winding. Such is usually carried out by means of more or less complicated starter devices including electromechanical switches and/or relays whose moving parts are subject to arcing and wear. As a result, these starter devices cannot be used in locations where explosions may occur.

More recently, the known electromechanical starter devices have been replaced by semi-conductor switch devices. In these devices, a semiconductor switch is connected in series with the starting winding of the motor and the A.C. source to energize or disconnect the starting winding. The semiconductor switch is open or closed according to a control voltage appearing through a sensing device responsive to the decrease of the current in the running winding of the motor as speed increases. Such semiconductor switch devices are much more compact than the electromechanical devices and are not subject to arcing and wear since they do not have moving parts. They may also be encapsulated and thus protected against vibrations, dust, humidity, etc.

In most of the cases, the sensing device that is used to control the opening or closing of the semiconductor switch is a current sensing element connected in series with the main winding of the motor, such as a current transformer, a resistor, a relay-activating resistor, an inductor, etc. Only U.S. Pat. No. 3,882,364 (Wright et al) mentions a sensing device that detects the magnetic flux variations in the magnetic core of a single pole of the stator of the motor. This sensing means consists of a coil winded around the pole. In this patent however, the information given by the sensing device may be treated by a complex electronic circuit to control the semiconductor switch.

It is the object of the invention to provide a starter device for a single phase A.C. motor in which the sensing device used to control the semiconductor switch senses the magnetic flux forced out of the saturated magnetic cores of two adjacent poles of the main winding of the motor during the initial inrush of current passing through the main winding upon starting of the motor.

More particularly, the present invention proposes a starter device for a single phase A.C. motor having a main winding and a starting winding disposed for connection to a single A.C. source, comprising:

a semiconductor switching device having a control electrode and a transconductive path between two power electrodes;

circuit means for connecting the transconductive path of the semiconductor switching device in series with the single A.C. source and the starting winding to energize or disconnect the starting winding;

sensing means disposed between two adjacent poles of the main winding of the stator of the motor to sense the magnetic flux forced out of saturated magnetic cores of these two adjacent poles by the initial inrush of current passing through the main winding upon starting of the motor, these sensing means having an axis of detection extending in the the direction of the lines of the magnetic flux; and means for connecting the sensing means between the control electrode and one of the power electrodes of the semiconductor switching device.

In operation, the current induced through the sensing means by the magnetic flux upon starting of the motor will render the semiconductor switching device conductive by supplying the control electrode of the semiconductor switching device to energize the starting winding of the motor to start the motor, whereas after the motor runs at nominal speed, the current through the main winding will decrease, causing a decrease of the current induced in the sensing means supplying the control electrode because of the reduction of the magnetic flux induced in the magnetic cores of the two adjacent poles of the motor; then the conduction through the semiconductor switching device will stop and thus disconnect the starting winding of the motor.

The invention will be better understood from the following description of a preferred embodiment thereof with reference to the accompanying drawings, wherein.

Figure 1:
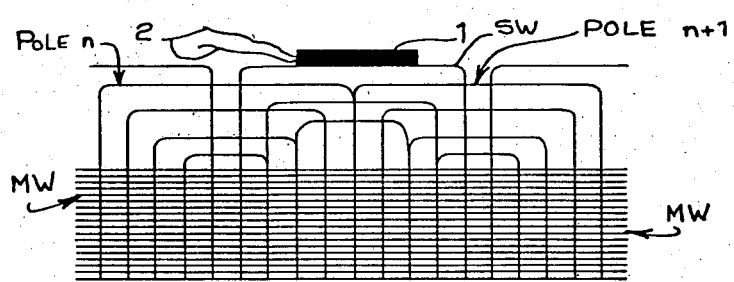
FIG. 1 is a side elevational view of part of the stator of an A.C. motor showing sensing means of the invention.

FIG. 1 shows the position of the sensing means 1 used in accordance with the invention for sensing the magnetic flux forced out of the saturated magnetic cores of two adjacent poles (n) and (n+1) of a single phase A.C. motor. These means 1 which consists of a coil winded on a magnetic core is positioned between the poles (n) and (n+1) and is connected by two wires 2 to the circuit of the starter device of the invention. The symbols (MW) and (SW) used on FIG. 1 respectively represent the main winding and the starting winding.

The basic principle of the starter device according to the invention is as follows:

Upon starting of the motor, the initial inrush of current passing through the main winding (MW) causes a saturation of the poles (n) and (n+1). As the sensing coil 1 is disposed between the adjacent poles (n and n+1) and its axis of detection extends in the direction of the lines of magnetic flux, the dispersed lines of magnetic flux forcing out of saturated magnetic cores of the adjacent poles (n and n+1) concentrate through the magnetic core of the sensing coil 1. The flux passing through the sensing coil 1 then becomes variable and induces a current that is used to activate the control electrode of a semiconductor switching device, which may be, for instance, a triac. This device is used to energize the starting winding (SW). Of course, it is compulsory that the sensing coil 1 be disposed between two adjacent poles of the motor and its axis in accordance with the lines of the magnetic flux.

After the motor runs at nominal speed, the current through the main winding (MW) will decrease toward its nominal value, causing a decrease of the current induced through the sensing coil 1 because of the reduction of saturation of the poles (n and n+1). As a result, the magnetic flux through the magnetic core of the sensing coil 1 will also decrease and no more current will be induced to supply the control electrode of the switching device that will disconnect the starting winding (SW).

Figure 2:
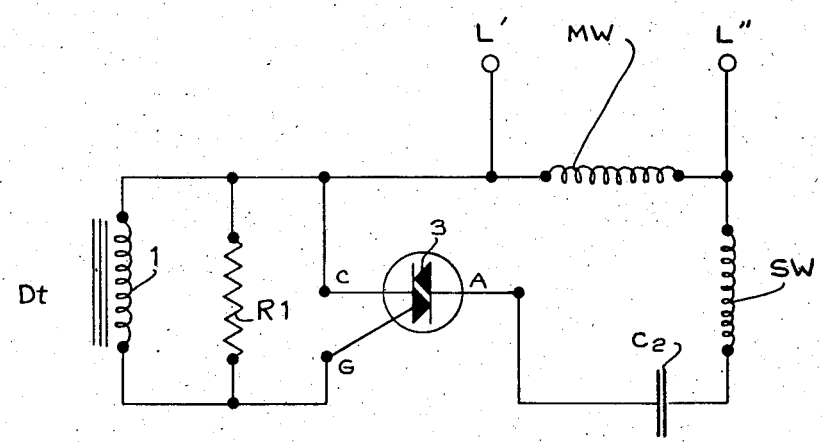
FIG. 2 is a diagrammatic circuit of the starter device according to the invention.

FIG. 2 is a diagrammatic circuit of the starter device according to the invention. A single phase A.C. source (L' and L") supplies the main winding (MW) of the motor and is connected in series with the starting winding (SW), a phasing capacitor $C_2$ and the transconducting path (between A and C) of a triac 3, which thus may energize or disconnect the starting winding (SW). The power electrode A of the triac is connected to the starting winding (SW) via the phasing capacitor $C_2$ while the power electrode C is connected directly to the single phase A.C. source terminal L'. The sensing coil 1 is mounted in parallel with a resistor $R_1$ between the power electrode C and the control electrode G of the triac.

As can be understood, the triac 3 is activated and energizes the starting winding (SW), as soon as a current is induced through the sensing coil 1 supplying the control electrode G. On the other hand, the starting winding (SW) is disconnected as soon as no more current is induced through the sensing coil 1, as no current is then supplied to the control electrode G. The resistor $R_1$ mounted in parallel with the sensing coil 1 protects the control electrode against any parasitic current that may appear through the sensing coil 1.

Figure 3:
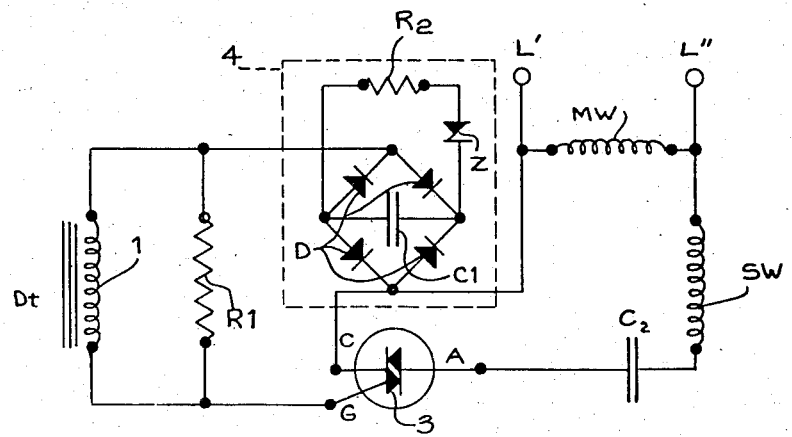
FIG. 3 is a variant of the circuit of FIG. 2, including a limitating time circuit.

FIG. 3 illustrates a variant of the circuit shown on FIG. 2. In this variant, a time limiting circuit 4 is added. This time limiting circuit 4 comprises a bridge rectifier circuit using semiconductor diodes D mounted in series with the sensing coil 1 and the power electrode C of the triac 3 to charge a polarized capacitor $C_1$. The polarized capacitor $C_1$ is mounted diagonally in the rectifier bridge. As soon as a voltage (or current) appears through the sensing coil 1 while the capacitor $C_1$ is discharged, a current passes through the capacitor and activates the triac 3 by supplying the control electrode G. This current simultaneously charges the polarized capacitor $C_1$ through the power electrode C of the triac 3. At this moment, the triac 3 supplies the starting winding (SW) of the motor. The conduction through the triac 3 (between A and C) remains until the voltage induced through the sensing coil is greater than the voltage through the capacitor $C_1$; i.e. until the control electrode is supplied.

A voltage drop through the sensing coil will stop conduction through the triac as the voltage of the capacitor $C_1$ is greater than the voltage of the detecting means. The capacitor $C_1$ then discharges through a resistor $R_2$ at a Zener diode Z voltage. When the capacitor $C_1$ is discharged, the starter device is ready for another starting of the motor, as soon as a voltage (or current) is induced through the sensing coil 1.

Although the invention has been disclosed with reference to a preferred embodiment thereof, it should be understood that the above described arrangement of the sensing means and switching device may be varied and that the invention is meant to cover such variations.

I claim:

1. A starter device for a single phase A.C. motor having a main winding and a starting winding disposed for connection to a single A.C. source, comprising:
    a semiconductor switching device having a control electrode and a transconductive path between two power electrodes;
    circuit means for connecting said transconductive path of said semiconductor switching device in series with said single A.C. source, and said starting winding to energize or disconnect said starting winding;
    sensing means disposed between two adjacent poles of the main winding of the stator of the motor to sense the magnetic flux forced out of saturated magnetic cores of said two adjacent poles by the initial inrush of current passing through said main winding upon starting of the motor, said sensing means having an axis of detection extending in the direction of the lines of said magnetic flux; and
    means for connecting said sensing means between said control electrode and one of said power electrodes of said semiconductor switching device, whereby the current induced through said sensing means by the magnetic flux upon starting of the motor will render said semiconductor switching device conductive by supplying said control electrode of said semiconductor switching device to energize said switching winding of the motor to start the motor, whereas after the motor runs at nominal speed, the current through said main winding will decrease, causing a decrease of the current induced in said sensing means supplying said control electrode because of the reduction of the magnetic flux induced in said magnetic cores of said two adjacent poles of said main winding of the motor; then the conduction through said semiconductor switching device will stop and thus disconnect the starting winding of the motor.

2. A starter device as defined in claim 1, wherein said sensing means are constituted by a coil winding on a magnetic core.

3. A starter device as defined in claim 1, wherein said semiconductor switching device is a triac.

4. A starter device as defined in claim 2, wherein a resistor is mounted in parallel with said sensing means for protecting the control electrode against possible parasitic current appearing through said sensing means.

5. A starter device as defined in claim 4, further comprising a bridge rectifier circuit using semiconductor diodes in series with said detecting means, the control electrode and one of the power electrodes of said semiconductor switching device to charge a polarized capacitor, said polarized capacitor being disposed diagonally in said rectifier bridge to limit the time of conduction of said semiconductor switching device by stopping the current flow through said control electrode when said polarized capacitor is charged.

6. A starter device as defined in claim 5, wherein a resistor in series with a Zener diode are connected in parallel with said polarized capacitor in order to discharge said capacitor at the Zener diode voltage when no induced current appears through said sensing means and threfore when said semiconductor switching device stops conduction.

* * * * *